Jan. 12, 1960  M. SINGER  2,920,327
SAFETY DEVICE FOR THE EYES
Filed July 12, 1957
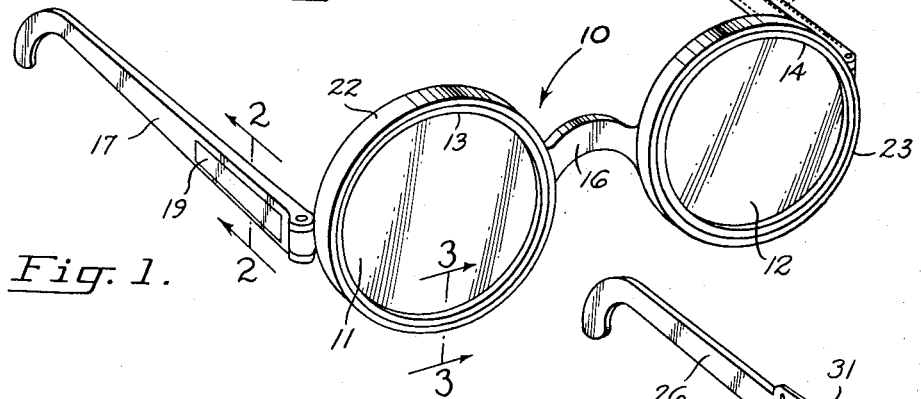
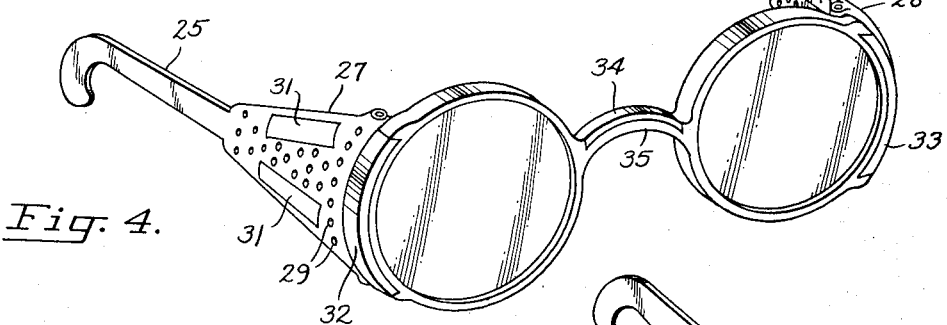
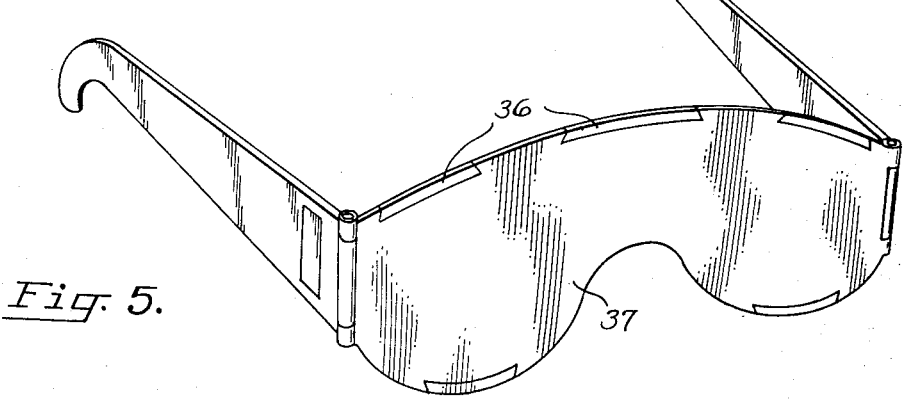
INVENTOR.
Milton Singer
BY
Ramsey and Kolisch
Attys.

United States Patent Office 2,920,327
Patented Jan. 12, 1960

2,920,327
SAFETY DEVICE FOR THE EYES
Milton Singer, Portland, Oreg.

Application July 12, 1957, Serial No. 671,448

3 Claims. (Cl. 2—14)

This invention relates to safety devices to be worn over the eyes and more particularly to eyepieces such as goggles, eyeglasses, and the like, which include in their construction a magnetized deflector element operable to attract ferromagnetic particles carried by the air to the magnetized element, to remove the particles from the air and prevent eye injuries.

It is common practice in industry to equip and require employees to wear safety glasses or goggles when these employees are working in areas where there is danger to the eyes, e.g., where foreign matter is discharged in the air by machinery such as grinding wheels, presses, punches, etc. This foreign matter is also quite commonly of a ferromagnetic nature, and the present invention is directed to preventing such material from getting into one's eyes. As used herein the term "ferromagnetic" is employed according to its usual meaning, i.e., materials such as iron, cobalt and nickel, which are magnetic to a high degree.

While safety glasses have been in use for some time, devices of this type known to date leave something to be desired as evidenced by the large number of eye injuries that occur despite the use of safety glasses. For one thing, eyeglasses are constructed with lenses carried forwardly of the eyes and with no protection to the sides of the eyes, and the lenses only deflect particles coming directly toward the eyes.

Foreign matter can easily enter an eye through the unprotected spaces around the sides of the eyes. Other types of safety goggles or eyepieces are constructed with side shields or hoods designed to conform somewhat to the contours of the face of the wearer. However, these devices are often cumbersome and uncomfortable and often not worn by workers who should protect their eyes. Further, they have the disadvantage of tending to fog up in humid weather. If apertures are provided in the side shields or hoods to prevent such fogging, potential passageways are provided for the entrance of particles into the eyes.

An object of this invention is the provision of safety devices to be worn over the eyes which are provided with magnetized deflector elements, comprised of magnetized ferromagnetic material, arranged in the devices so as to attract ferromagnetic particles carried toward the eyes. The magnetic poles of a deflector element are exposed and produce a protective magnetic field around the eyes. These safety devices are light, comfortable to wear, relatively inexpensive, and protect against eye injury from ferromagnetic particles.

More specifically, it is an object of this invention to provide safety eyeglasses or goggles which include such deflector elements and wherein the deflector elements are carried in the frames of the glasses. Depending on which portions of the frames the deflector elements are mounted, they will be suitably shaped. The deflector elements may be polarized transversely of their length, that is, across their short dimension, so that in an elongated deflector element, a continuous magnetic field is provided along its length.

The foregoing and other objects and advantages are attained by the present invention, various novel features and advantages of which will become more fully apparent when the following description is read in conjunction with the accompanying drawings, wherein:

Fig. 1 is a perspective view of an embodiment of the invention, the figure illustrating a pair of eyeglasses constructed with deflector elements arranged along the bows of the eyeglasses and around the lenses of the eyeglasses;

Fig. 2 is a section view along the line 2—2 in Fig. 1;

Fig. 3 is a section view along the line 3—3 in Fig. 1;

Fig. 4 is a perspective view of a pair of eyeglasses constructed in accordance with a modified form of the invention; and Fig. 5 is a perspective view of still another form of eyeglasses constructed according to the invention.

Referring to the drawings wherein various embodiments of the invention are illustrated, and more particularly to Figs. 1, 2 and 3, safety glasses according to the invention comprise generally a frame indicated generally at 10 carrying a pair of lens portions 11 and 12. The lenses are conventional and may be comprised, for example, of a nonshattering glass material or plastic. The lenses may be tinted or untinted, depending upon the conditions under which the eyeglasses are to be used. Frame 10 includes a mounting portion, having bands 13 and 14 which carry the lenses for the glasses and a bridge portion 16 adapted to rest over the bridge of the nose of a wearer. Pivotally connected to the mounting portion are a pair of side pieces or bows 17 and 18 which secure the glasses to the head of a wearer.

Extending along bows or side pieces 17 and 18 and with their ends exposed are a pair of elongated deflector elements 19 and 21. The inner ends of elements 19, 21 (i.e., the ends nearer the hooked-over portions of bows 17, 18) lie at intermediate portions of the bows which are carried by a wearer of the glasses adjacent his temples. The outer ends of elements 19, 20 are next to the ends of the bows which are secured to the mounting portion for lenses 11, 12. These deflector elements may be carried by the frames for the glasses in any suitable manner so long as they are held firmly in place. As illustrated in Fig. 2, each of the deflector elements may be constructed with a trapezoidal cross-section, the inner face of the element being slightly larger than the outer face. If bows 17 and 18 are comprised of a flexible plastic material, the deflector elements may then be snap fitted into appropriate channels formed in the bows as illustrated in Fig. 2. In this way, the deflector elements are carried on the surface of the bows and firmly held in position. The deflector elements may be polarized longitudinally of their length or transversely of their length. Each of the deflector elements creates a magnetic field in the space around the end of a bow which is located next to a lens for the glasses. This is the space which lies in the vicinity of the eye when the glasses are worn.

Superimposed around band portions 13 and 14 are a pair of continuous elongated deflector elements 22 and 23. These may be affixed to the band portions, as illustrated in Fig. 3, by adhering the inner face of a deflector element to the outer face of a band, using a suitable adhesive. When the deflector elements are continuous, they ordinarily would be polarized transversely of their length or, in other words, across either their width or thickness. Deflector elements 22 and 23 create a magnetic field in the space around the lenses of the glasses, this space also lying in the vicinity of the eyes when the glasses are worn.

When glasses are worn, the largest voids between the lenses for the glasses and the wearer's face usually are located on either side of the glasses. Portions of elements 22, 23 rim the lenses at these points to provide shielding protection for these voids. Put in another way, the peripheral portions of lenses 11, 12 which extend outwardly from the nose of a wearer to either side of his face, and which are located between where bands 13, 14 lie adjacent the brows and cheekbones of a wearer (the upper and lower portions of the bands), have superimposed thereover portions of elements 22, 23.

The deflector elements may be constructed from conventional ferromagnetic materials. Exemplary of the materials commonly used today to make permanent magnets are the carbon steels and alloys of iron with tungsten or chromium. Recently there has been developed a superior ferromagnetic material known as Alnico which is an alloy of cobalt, nickel, aluminum, and copper. Deflector elements comprised of this type of alloy are highly satisfactory. The degree of magnetization of the deflector elements may be varied depending upon the size particle it is desired to attract.

Figs. 4 and 5 illustrate modifications of the eyeglasses of this invention. Referring to Fig. 4, in this instance, the eyeglasses include a pair of shield bows 25, 26 of the eyeglasses include a pair of shield portions 27 and 28 pivotally connected to the band of the frame and extending rearwardly of the lenses in the glasses. The shield may be perforated as by perforation 29 to decrease the fogging tendency of the glasses. In this instance, deflector elements 31 are carried in cut out portions formed in the shield portions and serve to attract particles of ferromagnetic material which otherwise might travel around the shield portions or through perforations 29. The deflector elements may be adhesively or otherwise fastened in position. Deflector elements 32, 33, 34 may be also included on the band portions for the glasses and on bridge portion 35. Added protection is provided by deflector element 34 which produces a magnetic field in the space around the bridge of the nose, an area ordinarily not tightly closed off by conventional safety glasses. Fig. 5 illustrates another form of safety glasses with deflector elements 36 carried directly in a plastic sheet portion 37 forming the lens for the eyeglasses.

From the above, it will be apparent that the safety glasses of this invention have a number of advantages. By the expedient of setting up magnetic fields in the voids ordinarily found between the frames of a pair of glasses and the face of a wearer, particles which otherwise could cause eye injury are effectively removed from the air before being carried into the eyes. By the use of safety glasses of this invention, it is no longer necessary to equip an individual with tightly fitting goggles clamped closely to his face in order adequately to protect his eyes. The glasses are worn comfortably and may be designed so that ample air circulation is provided around the lenses of the glasses so as to reduce fogging up of the lenses.

Although the embodiments of the invention illustrated show the magnetic deflectors as being separate elements which are added to an existing frame for safety glasses, it is contemplated according to the invention that the frames or parts thereof could be magnetized. The frames themselves could be of magnetic or magnetizable material, or a coating of magnetic material could be provided on the frames or portions thereof.

While there have been described some embodiments of this invention, it is not intended to be limited thereby, and it is desired to cover all modifications which would be apparent to one skilled in the art and that come within the scope of the appended claims.

It is claimed and desired to secure by Letters Patent:

1. As an article of manufacture, safety glasses adapted to be worn over the eyes; said glasses having lenses; frame structure including side pieces adapted to be positioned on the head of a wearer and a mounting portion secured to one set of ends of said side pieces carrying the lenses for the glasses; a first set of elongated, exposed, deflector elements comprised of magnetized ferromagnetic material extending along the side pieces at least substantially the distance between the ends of the side pieces which are secured to said mounting portion and intermediate portions of the side pieces which are adapted to be positioned adjacent the temples of a wearer; and a second set of elongated, exposed, deflector elements comprised of magnetized ferromagnetic material substantially encircling the periphery of the lenses for said glasses; said deflector elements being operable to attract ferromagnetic particles carried into the vicinity of the deflector elements.

2. As an article of manufacture, safety eyepieces to be worn over the eyes; said eyepieces comprising a pair of lens portions and a frame; said frame having a pair of opposed side pieces adapted to support the eyepieces on the head of a wearer and a mounting portion mounting the lenses interconnecting said side pieces and secured at opposite ends to one end of each of said side pieces; said mounting portion having for each lens portion a base adapted to be positioned adjacent the cheekbone of wearer and a top disposed on the opposite side of the lens portion from said base adapted to be positioned adjacent the brow of a wearer; said mounting portion also having for each lens portion an elongated and exposed, magnetized deflector portion of ferromagnetic material extending around the outer edge of the lens portion at least substantially the entire distance from said base to said top; said deflector portions being operable to attract ferromagnetic particles carried into the vicinity of said eyepieces.

3. The eyepieces of claim 2 which further comprises an elongated and exposed magnetized deflector portion of ferromagnetic material for each side piece which extends from said one end of the side piece which is connected to said mounting portion toward the other end of the side piece, and which extends at least a major part of a distance between said one end and the center of the side piece.

References Cited in the file of this patent

UNITED STATES PATENTS

| 259,574 | Murdock | June 13, 1882 |
| 1,831,393 | Pierce | Apr. 29, 1930 |
| 2,770,168 | Tesauro | Nov. 13, 1956 |

FOREIGN PATENTS

| 1,037,755 | France | May 6, 1953 |